United States Patent [19]

Hockemier

[11] Patent Number: 5,105,063
[45] Date of Patent: Apr. 14, 1992

[54] FUEL HEATING SYSTEM UTILIZING A LIQUID LEVEL RESPONSIVE THERMISTOR SELECTOR

[76] Inventor: Roger G. Hockemier, Unit 163-8, Osino, Nev. 89801

[21] Appl. No.: 627,954

[22] Filed: Dec. 17, 1990

[51] Int. Cl.⁵ .......................... H05R 1/02; F24H 1/10
[52] U.S. Cl. .................... 219/205; 123/549; 123/557; 392/451
[58] Field of Search ............... 392/449–464; 219/205, 437; 123/549, 557

[56] References Cited

U.S. PATENT DOCUMENTS

| | | | |
|---|---|---|---|
| 2,256,919 | 9/1941 | Ackerman | 392/454 |
| 4,424,422 | 1/1984 | Bell et al. | |
| 4,684,786 | 8/1987 | Mann et al. | |
| 4,723,065 | 2/1988 | Meyer | |
| 4,865,005 | 9/1989 | Griffith | |

FOREIGN PATENT DOCUMENTS

| | | | |
|---|---|---|---|
| 724784 | 5/1932 | France | 392/449 |
| 58-11345 | 1/1983 | Japan | 392/454 |
| 58-104449 | 6/1983 | Japan | 392/451 |
| 946992 | 1/1964 | United Kingdom | 392/451 |
| 1066495 | 4/1967 | United Kingdom | 392/454 |

*Primary Examiner*—Bruce A. Reynolds
*Assistant Examiner*—John A. Jeffery

[57] ABSTRACT

A heater systen for a diesel fuel tank to minimize jelling of the fuel during operation at low wintertime temperatures includes an immersion heater that is selectively controlled by two temperature sensors (thermistors) positioned at different levels in the fuel tank. A liquid level responsive means operates a selector switch to alternately connect the two sensors to the heater as a response to changes in liquid level.

3 Claims, 1 Drawing Sheet

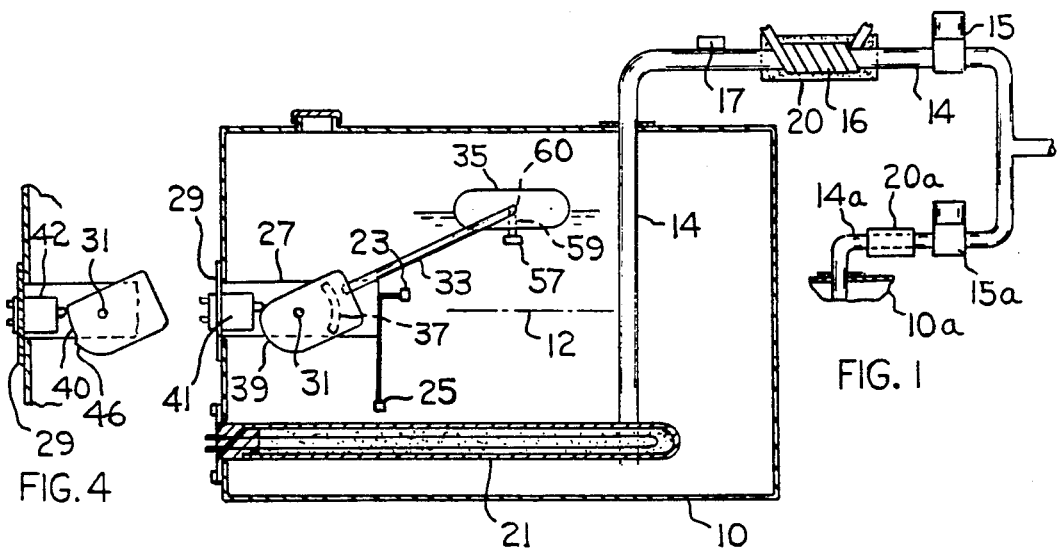
FIG. 1
FIG. 4
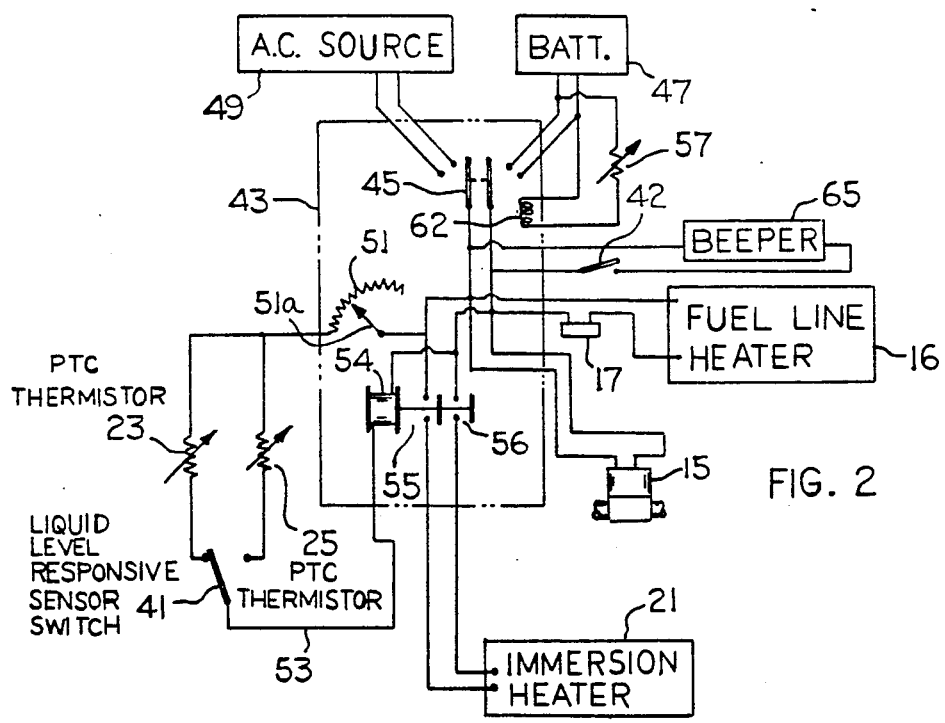
FIG. 2
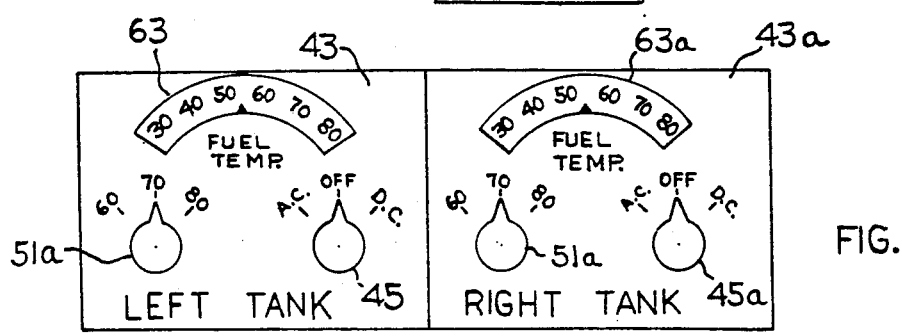
FIG. 3

FUEL HEATING SYSTEM UTILIZING A LIQUID LEVEL RESPONSIVE THERMISTOR SELECTOR

BACKGROUND AND SUMMARY

This invention relates to an electric heater system for heating-diesel fuel contained within tanks used to supply fuel to a diesel engine. The engine could be located e.g. in a truck, construction equipment, mining equipment, farm equipment (a tractor), or ship. The heating system is used to prevent or minimize jelling of the fuel and the build-up of wax crystals in the fuel when the tank is exposed to winter or arctic temperatures.

In some respects this invention is similar to inventions disclosed in U.S. Pat. No. 4,424,422 to Bell et al, U.S. Pat. No. 4,684,786 to Mann et al, U.S. Pat. No. 4,723,065 to H. Meyer, and U.S. Pat. No. 4,865,005 to E. Griffith. A principal object of the present invention is to heat the fuel in diesel fuel tanks so that the temperature in the tanks is substantially uniform throughout each tank, with minimum localized hot spots that could lead to carbonization of the fuel or an unsafe operating condition. Another object of the invention is to provide a heater system that operates effectively whether the tank is full or substantially empty. In a preferred embodiment of the invention two separate tanks are provided for supplying fuel to a single engine. Each tank is equipped with a thermostatically controller heater system. Manual controls are provided for selectively connecting the tanks to the engine.

The invention contemplates the use of an immersion heater in the lower portion of each diesel fuel tank. Separate temperature sensors are located in the upper portion of each tank and in the lower portion of each tank for independently controlling the heater. A liquid level responsive device within each tank selectively connects the sensors to the respective heater, such that when the tank is substantially full the upper sensor controls the heater, and when the tank is less than one half full the lower sensor controls the heater. The aim is to achieve a fairly uniform liquid temperature whatever the quantity of liquid in each tank.

THE DRAWINGS

FIG. 1 is a sectional view taken through a diesel fuel tank having a heater system of the invention installed therein.

FIG. 2 is a diagram of an electric circuit that can be used to control the FIG. 1 heater system.

FIG. 3 shows a control panel that can be used with the FIG. 2 circuit.

FIG. 4 shows a structural detail used in the FIG. 1 system.

DESCRIPTION OF A PREFERRED EMBODIMENT OF THE INVENTION

The drawings showing a diesel fuel tank 10 that can be in the shape of a horizontal cylindrical drum having a cylinder axis 12. A second companion tank is fragmentarily shown at 10a. In a diesel tractor environment the two tanks will be located on the right and left sides of the tractor; each tank will have a separate thermostatically controlled fuel heater system. The illustrated tank 10 is equipped with a fuel delivery line 14 that leads from the tank to an engine requiring diesel fuel for its operation. Flow through the line may be controlled by a solenoid valve 15; a similar valve 15a is provided for the delivery line 14a leading from the other tank. The valves are alternately opened so that at any one moment only one of the tanks is connected to the engine. With further reference to line 14, an electrical heater 16 is helically wound around and along line 14 to heat the fuel as it flows from the tank to the engine. The heater thus prevents or minimizes jelling of the fuel, particularly at relatively low ambient temperatures at or below zero degrees Farenheit. A bimetal thermostatic switch 17 controls the flow of current through heater 16 as a response to ambient temperature levels; when the ambient temperature drops below the switch-actuation temperature heater 16 is energized to heat line 14. Thermal insulation 20 surrounds the heater to increase its effectiveness.

A second immersion heater 21 extends horizontally within a lower portion of tank 10 for heating fuel therein. As the fuel is heated it rises, such that displaced liquid of a lower temperature gravitates downwardly into the zone surrounding the heater. There is a circulation of liquid that promotes a fairly even temperature from the bottom surface of the tank to the liquid surface.

Heater 21 is turned on and off by two separate temperature sensors 23 and 25; each sensor may be a thermistor. These thermistors are selectively connected to the heater, such when the tank is more than about one half full the upper sensor 23 controls the heater, and when the tank is less than one half full the lower sensor 25 controls the heater. The purpose for this arrangement is to effectively locate the sensor reasonably close to the liquid surface where the temperature is likely to be the highest.

Thermistors 23 and 25 are mounted on a plate-like bracket 27 that extends into the tank from a face plate 29. A liquid-level sending unit is mounted on bracket 27 for swinging motion around a pivot shaft 31. The sending unit includes a swingable arm 33 having at its free end a paddle-type float 35 adapted to ride on the liquid surface, such that the position (inclination) of arm 33 is representative of the liquid level.

Arm 33 carries an electric slider that rides on (across) a potentiometric resistance 37 mounted on bracket 27. Lead wiring, not shown, extends from the slider-resistance assembly through face plate 29 for sending the liquid level signal to a gage on the vehicle dashboard. The liquid-level sending unit is essentially conventional, except that arm 33 is formed with two cam surfaces 39 and 40 operatively engaged with the actuators of two electric switches 41 and 42. Cam surface 40 and switch 42 are located behind the plane of the paper in FIG. 1. Cam surface 39 is mechanically engaged with the actuator of electric snap switch 41 so that when the liquid level is relatively high the switch actuator is in a non-deflected condition. When the tank is approximately one half full cam surface 39 deflects the switch actuator to operate the associated switch (i.e. switch the circuit connections).

Switch 41 acts as a selector mechanism for operatively connecting thermistor 23 to heater 21 when the tank is at least one half full, and for operatively connecting thermistor 25 to the heater when the tank is less than one half full.

FIG. 2 shows a circuit that can be used to control heater 21. The area within dashed lines 43 represents a control panel located within a truck or other vehicle containing the two tanks 10 and 10a, and the associated engine. A manual switch 45 has three settings, namely a first "off" position as shown, a second position connected to battery power supply 47, and a third position connected to the household current supply 49. The household current source will be used principally during non-operating periods of the vehicle to minimize current drain on the vehicle battery. The connection between manual switch 45 and A.C. source 49 will include an electrical outlet on the vehicle, and an extension cord from the vehicle to the A.C. source.

Switch 45 is connected to thermistors 23 and 25 through a manually adjustable resistance 51. The two thermistors are in electrical parallelism with each other, and in series connection with resistance 51 and selector switch 41. A circuit line 53 extends between switch 41 and the coil 54 of a relay 55. With sufficient current flow through the relay coil the associated relay contacts 56 are closed to energize heater 21.

Depending on the position of selector switch 41, thermistor 23 or 25 will provide a variable resistance which is additive to resistance 51. Each thermistor 23 or 25 will have a positive temperature coefficient of resistance such that low liquid temperatures reduce the resistance sufficiently to permit enough current to flow through line 53 to operate relay coil 54. As the liquid temperature increases (due to the action of heater 21) the thermistor resistance increases to de-energize the relay coil.

Manually adjustable resistance 51 can be used either as a calibration device or as a device to vary the actuation temperature for heater 21, i.e. the liquid temperature at which the two resistances (51, 23 or 51, 25) permit the necessary actuation current for coil 54.

The heating system produces a relatively uniform liquid temperature over a range of different liquid levels, e.g. substantially full or substantially empty.

As previously noted, there are preferably two fuel tanks 10 and 10a in the system. Each tank is equipped with a thermostatically-controlled heater system of the type shown in FIGS. 1 and 2. The circuitry for each heater system will have an individual control panel (43 in FIG. 2). FIG. 3 shows two individual control panels 43 and 43a for the separate heater systems. The panels 43 and 43a can be in close physical proximity to each other, but the respective electrical control circuits are separate from each other. The human operator can thereby select the tank that is to be connected to the engine, based on observation of the fuel temperature readings (on the respective panels 43 or 43a), and the fuel levels in the respective tanks.

The fuel temperature in tank 10 may be sensed by a thermistor 57 located on (or near) float 35; a similar thermistor would be used in the other tank. As shown in FIG. 2, the thermistor is carried on a downturned extension 59 of shaft portion 60 of arm 33; shaft portion 60 extends horizontally through float 35 to pivotably suspend the float, whereby the paddle-type float can maintain a horizontal attitude on the liquid level surface whatever the inclination of arm 33.

Arm 33 can be a hollow tube, thermistor 57 can be located on the extreme end of the tube, with the thermistor wiring extending through the tube to terminals located on face plate 29. As schematically shown in FIG. 2, thermistor 57 is in circuit with a coil 62 that responds to current flow therethrough to operate a fuel temperature gage. The gage is referenced by numeral 63 in FIG. 3.

In FIG. 3 numeral 45 references a manual switch for selecting the power source (battery or household current). Numeral 51a represents the manual controller that is used to select the temperature setting for immersion heater 21.

As an additional feature, each fuel tank may be equipped with an audible beeper 65 (FIG. 2) for indicating to the human operator that the respective fuel tank is empty or nearly empty. Sensing of a near-empty tank condition can be achieved by aforementioned cam surface 40 and switch 42. As float 35 gravitates to a point near the bottom of the tank cam lobe 46 on surface 40 actuates switch 42 to the circuit-closed condition, thereby providing an electrical signal representing a near-empty condition of the tank.

As shown in FIG. 2, switch 42 is in circuit with an audible beeper 65, such that when the switch 42 is closed the beeper emits an audible output alerting the human operator to the fact that it is then necessary to switch fuel delivery from the respective tank to the other tank. The switching operation involves turning one switch 45 to the off setting, and turning the corresponding switch on the other panel to the A.C. setting or D.C. setting.

What is claimed is:

1. In combination: a diesel fuel tank; a liquid line connected to said tank for delivering diesel fuel from the tank to an engine; an electric immersion heater extending horizontally within a lower portion of said tank for heating diesel fuel in the tank; a first temperature sensor located in an upper portion of the tank; a second temperature sensor located in a lower portion of the tank; a relay (55) having controlled contacts (56) connected to said immersion heater for supplying current thereto; a household current supply (49); a vehicle battery current supply (47); a manual switch means (45) operably connected between the two current supplies and the relay contacts, whereby in one position of said manual switch means the household current supply furnishes current to the heater through said relay contacts, and in another position of said manual switch means the battery current supply furnishes current to the heater through the relay contacts; a liquid level sensor means within the tank; an electric selector switch (41) controlled by said liquid level sensor means; said selector switch being in circuit with said first and second temperature sensors and the relay; an operating connection between said liquid level sensor means and the selector switch, whereby the first sensor and selector switch cooperatively control current flow to the relay when the tank liquid level is above a predetermined value, and the second sensor and selector switch cooperatively control current flow to the relay when the tank liquid level is below the predetermined value.

2. The combination of claim 1, wherein each temperature sensor is a thermistor; said thermistors being in electrical parallelism with each other.

3. The combination of claim 2, and further comprising a manually adjustable resistance in series connection with said thermistors to vary the liquid temperature at which the immersion heater is actuated by the relay.

* * * * *